United States Patent
Kunzman et al.

[11] Patent Number: 6,054,832
[45] Date of Patent: Apr. 25, 2000

[54] ELECTRONICALLY PROGRAMMABLE COLOR WHEEL

[75] Inventors: Adam J. Kunzman, McKinney; Satyan R. Kalyandurg, Plano, both of Tex.

[73] Assignee: Texas Instruments Incorporated, Dallas, Tex.

[21] Appl. No.: 09/085,982

[22] Filed: May 27, 1998

Related U.S. Application Data

[60] Provisional application No. 60/048,174, May 30, 1997.

[51] Int. Cl.⁷ .......................... H04N 9/083; G05B 11/28
[52] U.S. Cl. .................. 318/600; 318/799; 318/806; 318/599; 348/271; 348/743; 353/84; 388/811
[58] Field of Search .................................. 348/743, 270, 348/271; 353/31, 38, 84, 88; 345/32, 33, 110, 126; 362/35; 359/887, 889, 891, 618; 318/799, 806, 811, 432, 433, 600–605, 599; 388/804, 811

[56] References Cited

U.S. PATENT DOCUMENTS

| Re. 33,244 | 6/1990 | Davis et al. | 364/526 |
|---|---|---|---|
| 4,600,976 | 7/1986 | Callahan | 362/277 |
| 4,688,104 | 8/1987 | Wolcott | 386/42 |
| 4,825,256 | 4/1989 | Nakai et al. | 355/403 |
| 5,046,162 | 9/1991 | Ishikawa et al. | 348/270 |
| 5,121,198 | 6/1992 | Maronian | 358/527 |
| 5,233,385 | 8/1993 | Sampsell | 355/35 |
| 5,251,021 | 10/1993 | Parulski et al. | 358/500 |
| 5,528,317 | 6/1996 | Gove et al. | 348/743 |
| 5,555,106 | 9/1996 | Hsu | 358/512 |
| 5,625,424 | 4/1997 | Conner et al. | 348/743 |
| 5,642,202 | 6/1997 | Williams et al. | 358/406 |
| 5,668,572 | 9/1997 | Meyer et al. | 345/150 |
| 5,691,780 | 11/1997 | Marshall et al. | 348/743 |
| 5,706,061 | 1/1998 | Marshall et al. | 348/743 |
| 5,774,196 | 6/1998 | Marshall | 348/743 |
| 5,801,792 | 9/1998 | Smith et al. | 348/749 |
| 5,805,243 | 9/1998 | Hatano et al. | 349/5 |

*Primary Examiner*—Brian Sircus
*Attorney, Agent, or Firm*—Charles A. Brill; Frederick J. Telecky, Jr.; Richard L. Donaldson

[57] ABSTRACT

A display system using red, green, blue, and white light. The system derives data for the white portion of a color wheel or a white device from the red, green and blue data. The white portion of the color wheel is controlled as if it were another primary color on the wheel. Errors are prevented by a correction applied if the unfiltered light from the source has a different color temperature than the white light produced using the red, green and blue segments of the color wheel, or the devices for those colors. Analysis is performed on the data to determine if white light is necessary to be added to each frame of data.

7 Claims, 3 Drawing Sheets

ELECTRONICALLY PROGRAMMABLE COLOR WHEEL

This application claims priority under 35 U.S.C. §119(e)(1) of provisional application Ser. No. 60/048,174, filed on May 30,1997.

BACKGROUND OF THE INVENTION

1. Field of the Invention

This invention relates to display systems, more particularly to displays systems that generate images using colored filters.

2. Background of the Invention

One of the most common display devices is the cathode-ray tube (CRT), which generates colors from phosphors. The phosphors luminesce when struck by a stream of energy from the cathode-ray tube. The color that is produced depends upon the frequency of the energy.

A class of newer display systems do not use CRTs, but create images using an x-y grid of individually controllable elements. These devices, spatial light modulators, typically have one or more elements on their grid that correspond to a picture element (pixel) of the final image. They typically create color images by changing the color of the light that strikes the element, or the light transferred by the element to the display surface. The appropriate combination of colors, typically red, green and blue, and amounts of each color are determined for each pixel. The elements are then controlled to produce the proper amount of each color during a display frame time to allow the eye to integrate that mix of colors into the proper color.

The colored light can be produced in several ways. The system could used three separate devices, each with their own light sources of the appropriate colors. Alternately, the system could use three devices, but have one light source, with beam splitters splitting the appropriate light color prior to striking the device for that color. This last embodiment is more common, since having to use three light sources raise the cost of the system too much to make it practical. A system using three devices will be referred to as a spatial coloring system.

Use of one device and light source, or two devices and either one or two light sources are also possible. These systems can be more desirable, since having fewer devices means less cost. However, in order to produce two or three colors during one frame time requires some type of time division of the frame among the colors. Using two devices means that one device will have to produce two colors, and one device systems have to produce all three colors on that device. The time allocated for any color must be shortened. This type of filtering system will be referred to as a temporal coloring system.

Using one light source, whether it be for a spatial or temporal coloring system, reduces the available light for each color. For three-device systems, each device gets 33% (⅓) the light from the source, as does a one device system. Systems with two devices have one device that can get up to 50% of the light for the device processing one color, and as little as 25% of the light for the device handling two colors.

One solution for this problem has been suggested in U.S. Pat. No. 5,233,385, titled "White Light Enhanced Color Field Sequential Projection," and assigned to Texas Instruments, Incorporated. In that patent, the system added white light as either a segment of a color wheel, for temporal coloring systems, or a fourth device, for spatial coloring systems. However, the white portion of the frame was merely to add an overall brightness "floor" to the image. Depending upon the characteristics of the light source, the filters used, and the image being projected, this result can cause a washing out of the colors, especially in the high brightness areas of the image. Too much white light added to any of the primary colors causes that primary to become almost a pastel. However, the need to add brightness to the overall picture remains a problem.

Therefore, a solution is needed that allows addition of white light to increase overall brightness but that controls the white light to prevent washing out of the colors.

SUMMARY OF THE INVENTION

In a color wheel system, the color wheel is modified to include a clear segment. The modification includes taking into account the positioning of the clear segment to mitigate any possible artifacts that might occur. In a multiple device system, the signal is used to operate a separate modulator for the white light. Circuitry is included that compares between the white light produced by the red, green and blue components and the white light produced by the clear segment of the color wheel. This ensures that no color shifts or other artifacts occur. This information is stored in the color wheel module, allowing the display system in which it is used to have correct information for the color wheel. The module includes a sensor for determining when the index mark passes through the sensor range.

It is an advantage of the invention in that it eliminates hardware and calibration steps otherwise necessary to index the color wheel.

It is a further advantage of the system that it tailors the color filters to the individual system, making the color efficiencies higher, thereby producing a better image.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Spatial light modulators that use either color wheels or multiple devices to produce color reduce the amount of time available for each color. In a typical three-color wheel, each color gets 33% of the frame time for display, resulting in 33% of the total light available during a frame period being used for that color. In multiple device systems, unless there are three sources, each color gets at most 50% of the light available from the source during the frame time.

This low amount of light leads to dark images and can cause noticeable problems in already dim areas of the images. One technique to correct this problem is the use of a white area on the color wheel, or a separate device for white light. Currently, these techniques add a base level of brightness with the white light and then modulate the color segments as normally done. The base level of brightness is not controlled, other than to set and then monitor the base level for any image. An example of this technique is discussed in more detail in U.S. Pat. No. 5,233,385, titled "White Light Enhanced Color Field Sequential Projection," assigned to Texas Instruments, Incorporated, and incorporated by reference herein.

One of the problems with this technique is that it is universally applied to all areas of the image. It eliminates or minimizes the dark area dimness, but can make the bright areas of an image appear in almost pastel colors. One aspect of the present invention is that the clear, or white (these terms are interchangeable for the purposes of th is discussion), segment of the wheel is controlled independently of the other colors, as if it were one of the primary colors (red, green or blue). This allows control of the brightness for all areas of the image, making dark areas appear correctly, while not washing out the bright areas.

The System

Figure 1:
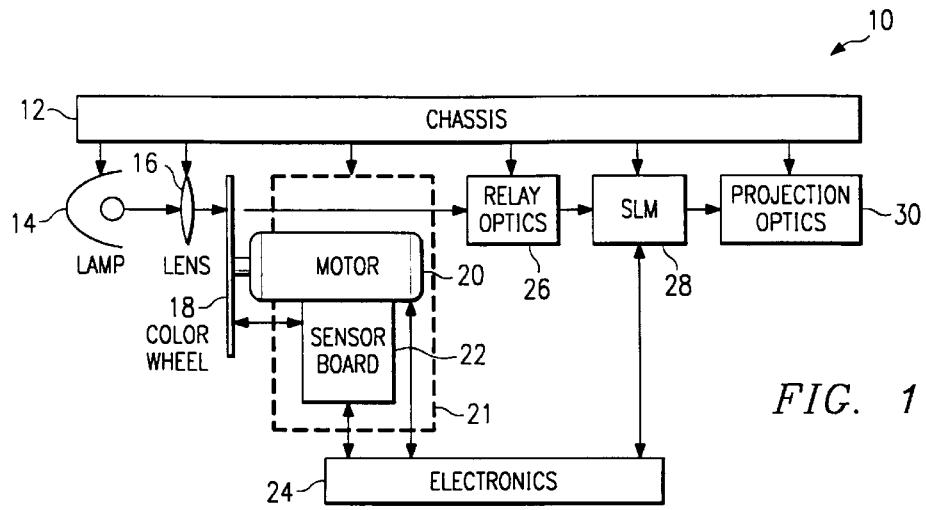
FIG. 1 is a block diagram of a color wheel display system.

Referring now to FIG. 1, a system level block diagram shows the parts of a color display system 10, sometimes referred to as an engine, used in accordance with the invention. The chassis 12 has mounted within it a lamp 14, a lens 16, which receives light from the lamp 14, and directs it through the color wheel 18. The color wheel 18 is operated by a motor 20, and calibrated by use of a sensor board 22. The wheel 18, motor 20 and sensor board 22, are all mounted by a bracket 21. The sensor board 22 and motor 20 are given operating instructions and communicate with the system timing and control electronics 24.

This example, for discussion purposes only, assumes a white light source and a color wheel. However, the addition of white light to a system is not dependent upon the light source and the means for producing color. The system could have three colored light sources, such as lasers, three white light sources with filters, one light source with filters, or other possible configurations. The use of the term "light source" is meant to include all of these possible combinations.

The timing and control of the system is critical, since light through the color wheel 18 and the relay optics 26, must impinge the active part of the spatial light modulator (SLM) array 28 in the proper color sequence. The image created by the array of individual elements on the array is then projected or displayed. The example of claim 1 involves projection optics 30, although the image could be directly viewed. Regardless of the final display surface, the electronics 24 must match the events of the color wheel 18 to the operation of the SLM 28.

Any variation in the motor speed or calibration of the filter affects what color the light is striking the SLM 28, which is also connected to the electronics 24. If the timing is not properly adjusted, the data for the red segment, for example, could be on the SLM 28, when the light coming through the color wheel is blue.

A second part of the timing and control is the determination of what areas of the image need how much brightness added during the clear segment. First, the brightness or white signal must be determined. This determination varies according to whether the incoming signal is video, which is typically in a YUV format, or computer graphics or data, which is typically in a RGB format.

The YUV format separates all of the grayscale of luminance (brightness)information into one channel, referred to as Y. The U and V signals contain color information. Typically, video undergoes a conversion of the U and V signals into the appropriate levels of red, green and blue (RGB) before being displayed on a SLM. In video, the Y signal is already provided, although it is used in determination of the color-space conversion to RGB. In computer graphics, the Y signal must be derived from the RGB inputs, since most computer-generated data is in RGB format. The calculation for each pixel is W=min(R,G,B).

Figure 2:
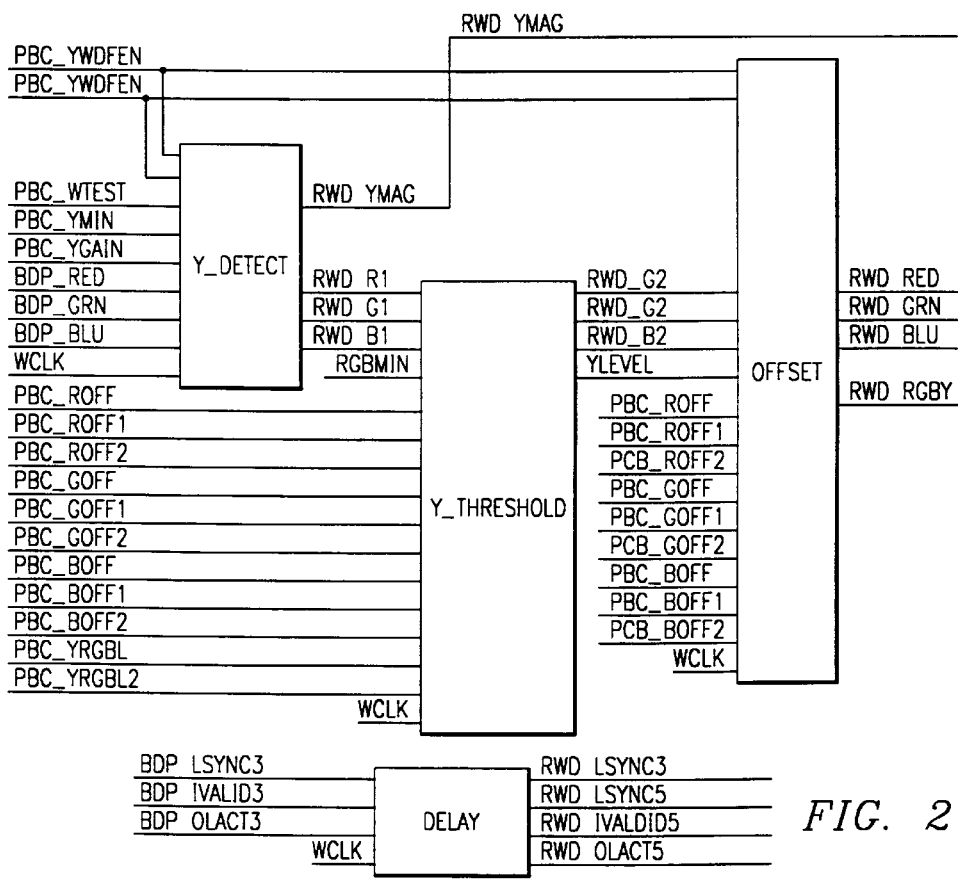
FIG. 2 is one embodiment of a color wheel in accordance with the invention.

An example of a circuit which performs this derivation is shown in FIG. 2. Each of the blocks on the diagram represent function blocks within a processor, or can be individual processing elements, even field-programmable gate arrays (FPGA) or application-specific integrated circuits (ASIC). The function blocks will be referred to by their names, rather than their parts.

The signal W is used for two purposes. It determines if gains is to be applied for each pixel, and it is used in the gain calculation. This is performed in the Y_DETECT block of FIG. 2. The gain that is actually applied is limited by the amount of white available within a given pixel. It can also be limited by a maximum gain signal that could be set by the user. The signal $C_{max}$ is defined to be the maximum of any value of color.

$$\text{if } (W \geq C_{\max}) \text{ then}$$

$$\begin{bmatrix} R' \\ G' \\ B' \end{bmatrix} = \begin{bmatrix} R + g(W - C_{\max}) \\ G + g(W - C_{\max}) \\ B + g(W - C_{\max}) \end{bmatrix}$$

At this point, the RGB signal dynamic range has been increased up to 2 times the original signal. While each pixel that exceeds $C_{max}$ has been brightened, the possibility of clipping exists. This is the situation in which the clear segment is used.

The equivalent brightness or weight of the Y segment can be determined for a given RGBY color wheel design. Some predetermined number of control bits per pixel, Y_LEVEL, are associated to modulate the clear segment. The white segment could be any number of bits. Implementations have been done with 1, 2 and 4 bits, although it could have just as many bits per pixel as the primary colors.

For any pixel, the Y signal is enabled when the R', G', or B' signals exceed the maximum dynamic range of the system. However, these values must be matched in hue and luminance for the potentially large intensity increase. This is controlled by the Y_THRESHOLD block. The logic in that block determines in which "bin" each pixel belongs. The bin is merely a grouping of intensity levels. How much offset is applied at the OFFSET block of FIG. 2 is determined by which bin a pixel falls into.

The three blocks described above and shown in detail in FIG. 2 is just one example of a brightness control scheme that can be used in accordance with this invention. For complete understanding of the necessary information to understand this example, however, a complete list of all of the signals is given below.

| Signal Name | Description | Associated Blocks |
| --- | --- | --- |
| WCLK | Pixel Clock | ALL |
| PBC_YMDSEL | Y Mode Select | Y_DETECT, OFFSET |
| PCB_RWDFEN | RGBY Function enable | Y_DETECT, OFFSET |

-continued

| Signal Name | Description | Associated Blocks |
|---|---|---|
| PBC_WTEST | RGBY Fault Coverage Test Enable | Y_DETECT |
| PBC_YMIN | Y Gain Threshold | Y_DETECT |
| PBC_YGAIN | Y Gain | Y_DETECT |
| BDP_RED | Red Pixel Data Bus Input | Y_DETECT |
| BDP_GRN | Green Pixel Data Bus Input | Y_DETECT |
| BDP_BLU | Blue Pixel Data Bus Input | Y_DETECT |
| PBC_ROFF0 | Red Offset Level 0 | Y_THRESHOLD, OFFSET |
| PBC_ROFF1 | Red Offset Level 1 | Y_THRESHOLD, OFFSET |
| PBC_ROFF2 | Red Offset Level 2 | Y_THRESHOLD, OFFSET |
| PBC_GOFF0 | Green Offset Level 0 | Y_THRESHOLD, OFFSET |
| PBC_GOFF1 | Green Offset Level 1 | Y_THRESHOLD, OFFSET |
| PBC_GOFF2 | Green Offset Level 2 | Y_THRESHOLD, OFFSET |
| PBC_BOFF0 | Blue Offset Level 0 | Y_THRESHOLD, OFFSET |
| PBC_BOFF1 | Blue Offset Level 1 | Y_THRESHOLD, OFFSET |
| PBC_BOFF2 | Blue Offset Level 2 | Y_THRESHOLD, OFFSET |
| PBC_YRGBL | Y Level 1 Threshold | Y_THRESHOLD |
| PBC_YRBGL2 | Y Level 2 Threshold | Y_THRESHOLD |
| RWD_YMAG | White Magnitude Output | Y_DETECT |
| RWD-Rx | Red Pixel Data Bus Delay stage x | ALL |
| RWD-Gx | Green Pixel Data Bus Delay stage x | ALL |
| RWD-Bx | Blue Pixel Data Bus Delay stage x | ALL |
| RGB_MIN | Detected Y Component | Y_DETECT, Y_THRESHOLD |
| YLEVEL | Y Content Level | Y_THRESHOLD, OFFSET |
| BDP_LSYNC3 | Line Synch | DELAY |
| BDP_IVALID3 | Input Valid Signal | DELAY |
| BDP_OLACT3 | Overlay Active | DELAY |
| RWD_LSYNC3 | Delayed Line Sync N-2 | DELAY |
| RWD_LSYNC5 | Delayed Line Sync | DELAY |
| RWD_IVALID5 | Delayed Input Valid Signal | DELAY |
| RWD_OLACT5 | Delayed Overlay Active | DELAY |

The DELAY block delays the synchronization signals the appropriate number of WCLKS, determined by the number of clocks the data is delayed on the main channel data. This ensures proper timing for the generated data. The output signals are RWD_YMAG, described above, and RWD_RED, RWD_GRN, RWD_BLU, and RWD_RGBY. The RWD_RED, etc., signals are the adjusted pixel data bus output for the colors for the pixel data bus that feeds the data to the SLM. RWD_RGBY is that data for the white or brightness output.

The Architecture

Figure 3:
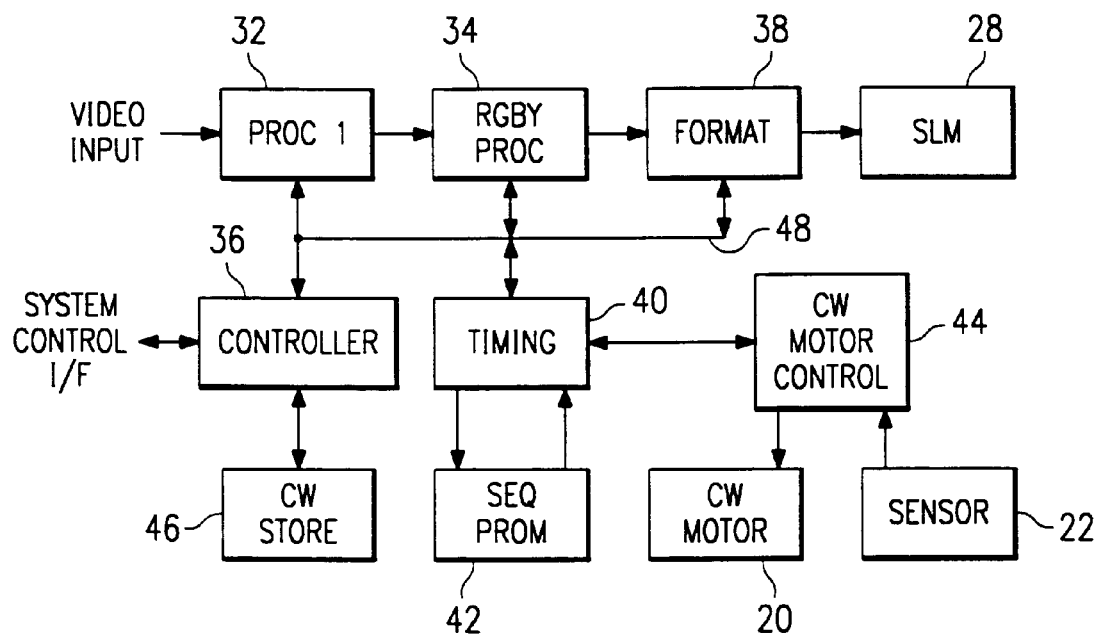
FIG. 3 is a schematic representation of a color filtration circuit used to generate a white component of the color.

This processing block is part of an overall control system, an embodiment of which is shown in FIG. 3. The input is received at a video processor, shown in FIG. 3 as block 32. This may be a separate processor, or it may be a function group on a shared processor with the other control functions. Examples of the video processing performed at this processing include color-space conversion, degamma processing and error diffusion functions. It could also include such things as progressive scan conversion and sharpening.

One video processing function performed by this block is degamma processing. Nonlinear display devices, such as CRTs, require a correction of brightness/voltage called the gamma correction. This is normally included in the video signal. Any linear device must remove or 'degamma' the incoming signal. The processing for the RGB signals to develop a Y signal must occur after this processing, for linear devices.

Once the color-space conversion is completed, the RGB signals are sent to the RGBY processing block 34. This block contains the logic discussed with reference to FIG. 2. Notice that this embodiment assumes the data was received in YUV format and had to be color converted to RGB. The input could also be computer graphics, which is already in RGB format.

After the data has been processed into RGBY data, it is sent to a formatter 36. The formatter performs functions converting typically rasterized image data into data for the x-y grid on the SLM 28. These function communicate and send data along a system bus 48.

The system bus 48 also sends the various control signals necessary to coordinate the data processing, formatting and movement of the data in time with the appropriate spoke on the color wheel. Necessary to this control is the system controller 36, which coordinates all of the operations. The controller 36 needs as one of its inputs, data from the color wheel EPROM 46, that has a function that will be discussed with regard to calibration of the color wheel below.

In addition to the master system controller, a separate timing block 40 is used to coordinate between the color wheel's movement, its current position and the data flow to the SLM 28. The information with regard to the color wheel is produced by the color wheel motor controller 44, which can also slow down or speed up the motor 20, as necessary. The motor controller also receives data from the sensor, 22, which will be discussed with regard to the programming of the color wheel below. The motor controller could be operated with a feedback loop, a magnetic sensor or a spectral sensor to determine the rate of the motor. The controller then speeds up the motor to match the frame rate.

The motor controller is responsible for detecting the frame rate of the incoming video/graphics signal. Based upon the controller's calculations, an appropriate PWM sequence is selected. If a new sequence is selected that has different PWM efficiencies, the system controller reads the appropriate table from the color wheel nonvolatile memory and updates the necessary RGBY coefficients.

This example uses PWM sequences as an implementation of the range of illumination efficiencies of the system. The illumination efficiencies could be implemented in other ways. For example, if the SLM were an LCD panel, the efficiencies would be based upon the amount of light transmitted through a crystal cell and the length of time that cell were in that state. Therefore, while this example uses PWM sequences, the true selection is based upon the efficiencies of the various PWM sequences available.

The Color Wheel

Figure 4:
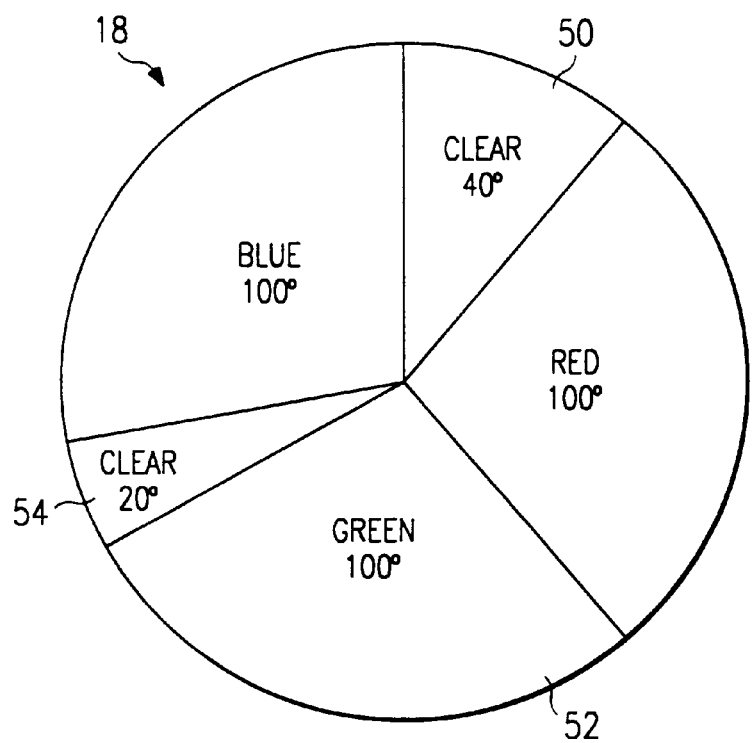
FIG. 4 is a schematic representation of a display engine architecture for an adaptive white enhanced display system.

The layout of the color wheel itself has an impact on the functioning and interaction of various components of the system in FIG. 3. One example of a color wheel layout is shown in FIG. 4. While this is only intended as an example, it is one that works under several constraints.

Some of the constraints under which a color wheel is designed are: brightness; white-point; rotation speed; and flicker performance. With regard to brightness, the overall system brightness must be increased to a level that makes the trade off of color saturation of the primary colors worth it. The design shown in FIG. 4 increased the color wheel SLM system efficiency of over 40%.

Current color SLM systems have a white point that has a slight cyan-tint associated with it. That is, the white of a system using a RGB only color wheel is not pure white, it has an imbalance that makes it have a slight cyan tint. Using a clear segment in a color wheel moves the system white point towards a purer white reproduction. The clear segments have a dichroic filter applied to them in this example such that the lamp white point is more closely matched to the white point created by the RGB segments. However, there may not be a need for any filter to be applied to the white light segment.

Even with this correction, flicker is noticeable at frame rates of 50 Hz, as is used in Europe. The color wheel allows a 4:3 frame up-conversion which creates a refresh rate of approximately 68 Hz. Since 480 degrees of the color wheel are presented during a given refresh time, a constant portion of the display time needs to contain data from the clear segment. If a design were not to take this into account, some frames would be brighter than others and have the effect of creating noisy areas in portions of the image that utilized the white segment.

The constraints of rotation speed and flicker interact. In current designs, each primary color has 120 degrees. This causes flicker in the green segment at display rates of 60 Hz or less. The use of a 40 degree clear segment 50 that is 180 degrees opposite the green segment 52, plus the reduction in size of the green segment from 120 degrees to 100 degrees, has been proven to reduce the amount of flicker by 30%.

Even with this correction, flicker is still noticeable at frame rates of 50 Hz, as is used in Europe. The color wheel allows a 4:3 frame up-conversion. The cause of the flicker is when a frame uses only RGB because the threshold was too low to require the addition of Y, but the next frame uses a white-bit (RGBY data) on the next frame, that pixel will be momentarily very bright. This is typically observed as a wave of sparkling pixels.

A comparison of two different modes of operating a color wheel are shown below. R, G, and B designate 120 degrees of those colors. The letters r, g, and b represent 60 degrees of those colors. The letter w represents 20 degrees of white, and W represents 40 degrees of white.

|  | Frame A | Frame B | Frame C |
| --- | --- | --- | --- |
| Current | brGrbbr | GrbbrG | rbbrGrb |
| Error | rb | G | Bw |
| RGBY | wRwGBwwR | wGBwwRwG | BwwRwGBw |
| Error | Rw | Gw | Bw |

In the current design, the sparkling appears in Frame C where there is added White, where there was no added white in Frame B, and where there is 120 degrees of green between Frames A and B. In the RGBY case, each frame has equal amounts of white energy, so no flickering or sparkle will occur. The extra white energy can be compensated for by reducing the white gain ¼ or increase the RGB offset values by ⅓. The w of the above sequences is shown in FIG. 4 as the 20 degree clear segment 54.

Use of the color wheel in FIG. 4 presents a unique set of artifact concerns. The main artifact occurs along intensity boundaries (where there is a large intensity shift) in an image where the white segment is enabled. Another constraint that can lead to artifacts is the use of 24-bit resolution, 8 bits for each color. In some systems, dithering is performed on bit-planes of each image. A bit-plane is a plane of data, each bit of which comes from the digital word for each pixel on the image. All of the bits in the bit-plane have the same binary significance.

The dithering of one or more bit-planes of image data reduces the number of bits needed to represent an image in memory. It can also reduce the number of clear or white bits needed for the clear segment.

These implementation factors can have two visual artifacts. A hue and/or luminance shift may occur if the clear-segment color varies or is improperly calibrated. The artifact appears as a step function or contour line, especially in a scene such as skies or sunsets. The other artifact appears due to pulse-width modulation (PWM) of the clear segment. It manifests as a flashing on the boundaries when the clear segment is enabled.

These PWM artifacts can be corrected by spatially diffusing them. The error diffusion aspect of the processor 32 can eliminate some of these problems. Use of a single red segment on the color wheel, as opposed to breaking the segment into two segments, allow the bit patterns to be more optimally placed. Linearity also improves since the optical transmission variations across a single dichroic element are significantly less than those across two elements. This will mitigate some of the errors that occur, including those due to variation or incorrect values in the clear segment correction.

Programming the Color Wheel

As mentioned above, and referenced earlier, it is necessary to 'program' the color wheel. The Y signal derived from the RGB inputs above may be different than the white produced by the lamp through the clear segment. The system can generate correction coefficients that account for these differences. In order to associate these correction coefficients such that any color wheel module can be used in any projector, the coefficients must be stored on the color wheel itself, or an indication of the color wheel type must be detectable.

The system shown in FIG. 1 shows one possible implementation of the color wheel module. It includes the color wheel, motor, bracket and sensor board. Referring to FIG. 3, it can be seen that an EPROM, or an EEPROM is also part of the module, which communicates with the system controller and other parts of the system. A necessary part of the information communicated is the location of the index mark on the color wheel.

Figure 5:
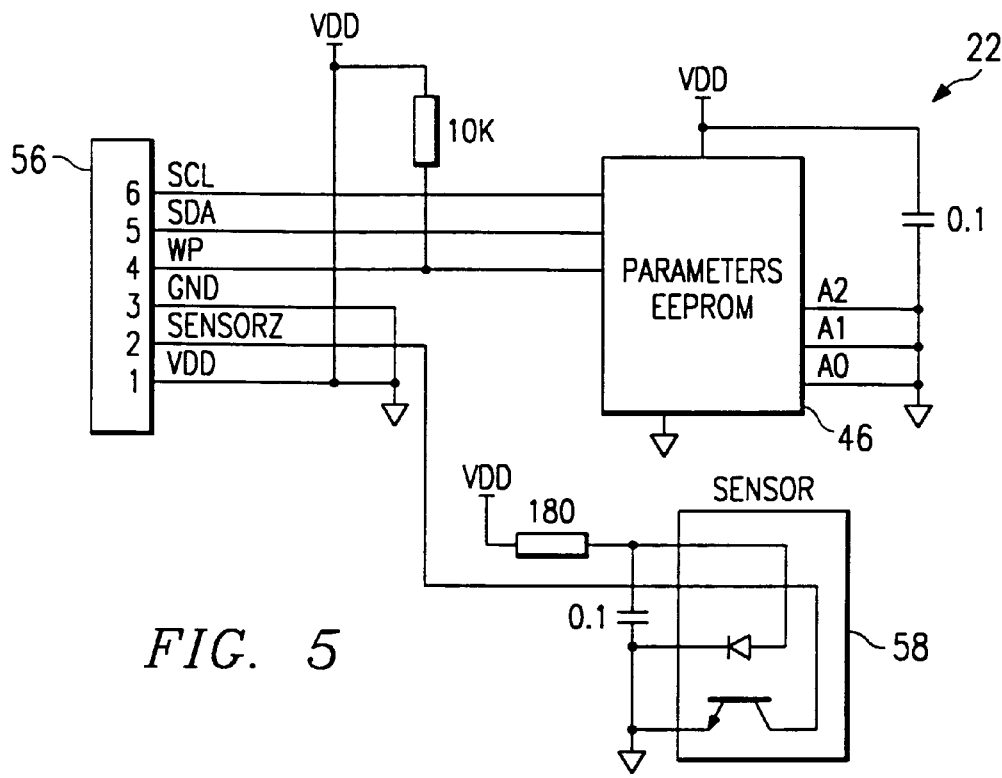
FIG. 5 is a schematic representation of a sensor board for electronic programming of a color wheel using white light.

The index mark on the color wheel acts as a timing reference to the system electronics, normally the mark occurs just before the red segment moves into the filter path. Typically, this mark is sensed by a sensor that has to be physically moved into the light path to ensure that the timing pulse occurs at the proper time. The use of a sensor board, an example of which is shown in FIG. 5, eliminates this need. The sensor could be magnetic, optical, or even electro mechanical to detect the index mark.

In previous designs, the sensor board was physically moved in order to nullify any mechanical variations in the index mark location relative to the segment spoke location. Instead of moving the sensor board, nonvolatile memory is programmed with a sequence start delay value. This delay value has the same effect as moving the sensor board, insuring that the sequence start command for a new PWM sequence occurs at the middle of the green/red segment boundary. Of course, use of the green/red segment boundary is based upon current color wheel configurations, it could be adapted to be on any boundary.

As part of the sensor board, an EPROM, EEPROM or other nonvolatile memory is used to store information about the color wheel. The information generated from the processing block of FIG. 2 is stored in the memory. Also, the correction coefficients, the offset between the location of the index mark and the absolute location of the color on the color wheel. Other useful information can be stored in the memory, including the serial number, part type or other information that can help in the manufacturing process. This nonvolatile memory can be any time of once-programmable memory, such as a PAL (programmable array logic), jumpers, fuses or other switches.

Another possibility of the nonvolatile memory is as an association table. A set of the various parameters could be generated for each color wheel class, then a list of possible classes created. When the class of color wheel is identified, the associated table could then be used, allowing a close matching of the color wheel and the parameters. This will mitigate some of the artifacts discussed above.

A diagram of the sensor board with its nonvolatile memory is shown in FIG. 5. Jumper or other connection 56 allows connection between the sensor board 22, including the nonvolatile memory 46, and the sensor 58, and the main system controller 36. The main system controller 36 is shown in FIG. 3. I While the various signal could be configure in several ways, one example of the signals that could be used are shown in FIG. 5. These signals are described below.

| Signal | Description |
| --- | --- |
| SCL | Serial Clock |
| SDA | Serial Data |
| WP | Write Protect |
| GND | Ground |
| VDD | Power Voltage |
| SENSORZ | Index Mark Detect |
| A2 | Address Select 2 |
| A1 | Address Select 1 |
| A0 | Address Select 0 |

Color Wheel Calibration

Having discussed at this point the system, the derivation of the Y value, the means for timing the color wheel and the place in which to store correction values, the discussion must turn to how those correction values are determined. A method for calibrating a color wheel is shown as a flow chart in FIG. 6.

In order to properly tune the color wheel system, several parameters must be set. If they are not, the system will have image artifacts such as intensity discontinuities, and color shifts. Currently, most systems do not use the RGBY system and therefore do not need calibration. For the system discussed above, a detailed calibration of the projector would be required without some way to approximate the parameters and maintain the close match between the approximation and the actual characteristics of the system.

Five system values are related to the various parameters that must be set for the system. The number of parameters set and their various implementations in the calibration procedure is left to the system designer. The five system values to be taken into account during the calibration process are: $Y_{RGB}$, lumens produced from only the RGB portion of the color wheel; $Y_{WS}$, lumens produced from only the white segment portion of the color wheel; $CC_r$, the color correction red factor; $CC_g$, the color correction green factor; and $CC_b$, the color correction blue factor.

In experimentation it was found that the color correction factors could be approximated by a linear relationship to $Y_{RATIO}$, which is the ratio of the $Y_{WS}$ parameter to the $Y_{RGB}$ parameter. The perceptual artifacts were evaluated using a measure of "just-noticeable differences" or 'jnd.' It was found that a jnd factor of 3 or less provided acceptable system performance. Using $Y_{RATIO}$ met this criterion.

Since all RGBY parameters are related to $Y_{RATIO}$, the system can be calibrated from pre-calculated tables which are indexed by the $Y_{RATIO}$. The $Y_{RATIO}$ can be easily measured on most test stations and the appropriate RGBY parameter set selected. However, this must be repeated for every PWM sequence used in the display engine, since the $Y_{RATIO}$ changes due to the SLM electronic efficiencies in red, green and blue.

This can be further minimized through the use of information on the light efficiencies for each of the PWM sequences. The $Y_{RATIO}$ can be measured at one rate (such as 60 Hz) of the color wheel rotation, and then scaled to other rates. The measurement of $Y_{RATIO}(60)$ would be as follows:

$$Y_{RATIO} = \frac{Y_{WS}(60)}{Y_R(60) + Y_G(60) + Y_B(60)}.$$

Using the PWM sequences, where $PWM_R$, $PWM_G$, and $PWM_B$ are the light efficiencies for the red, green, blue, and white segments at the given wheel rate, Y' factors for each color can be computed.

$$Y'_R = \frac{Y_R(60)}{PWM_R(60)};$$

$$Y'_G = \frac{Y_G(60)}{PWM_G(60)};$$

and $$Y'_B = \frac{Y_B(60)}{PWM_B(60)}.$$

The $Y_{RATIO}$ for other rates can then be computed as follows:

$$Y_{RATIO}(\theta) = \frac{PWM_{WS}(\theta) \cdot Y'_{WS}}{PWM_R(\theta) \cdot Y'_R + PWM_G(\theta) \cdot Y'_G + PWM_B(\theta) \cdot Y'_B}.$$

This process can be even further simplified, if the assumption that the denominator is equal to $PWM_{RGB} Y_{RGB}'$ for the given rate. This reduces the measurements necessary to calibrate the system to measuring the lumens produced by and RGB only white and the lumens produced by the white segment.

$Y_{RATIO}$ must be calculated or remeasured for every PWM sequence used in the display engine, since the $Y_{RATIO}$ since the SLM electronic efficiencies in red, green, and blue. The calculation of $Y_{RATIO}$ for other sequences is made by multiplying $Y_{RATIO}$ by the ratio of luminous efficiency of the measured sequence by the predicted luminous efficiency of the remaining sequences.

Figure 6:
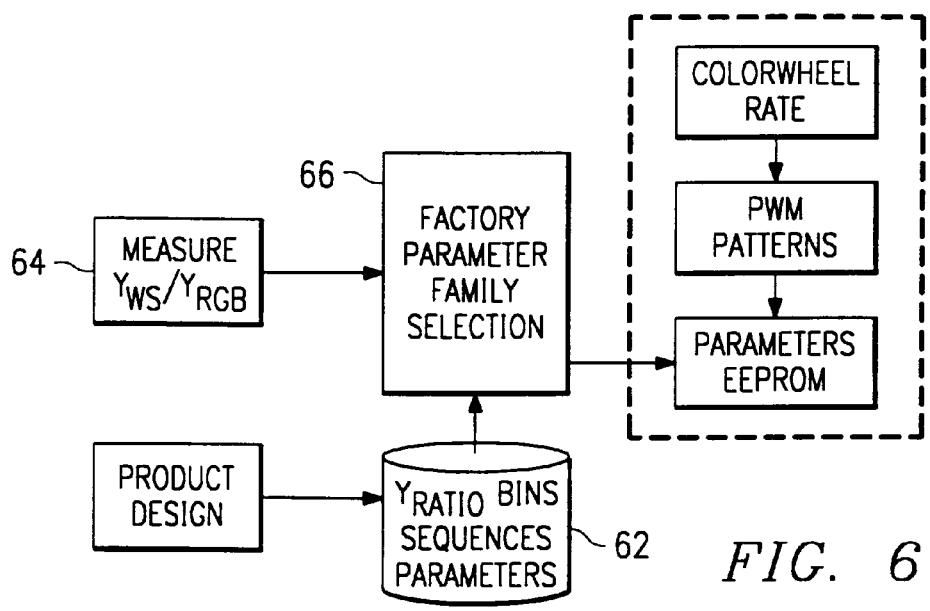
FIG. 6 is a flow chart of a color wheel calibration procedure.

The process of calibration is shown in FIG. 6. During the design process, the appropriate $Y_{RATIO}$s for each color wheel rate are programmed into the nonvolatile memory. Once these are programmed, the possible $Y_{RATIO}$ bins, PWM sequences and system parameters are used at step 62, in addition to the measurements mentioned above, taken at step 64, to select the appropriate color wheel class and its associated tables of data at step 66. Steps 62, 64 and 66 are typically performed at the calibration station. The final tables are programmed into the nonvolatile memory, in addition to the color wheel rates, and the PWM patterns. The final result is a display engine with a finely tuned color wheel system, mitigating any possible artifacts.

An alternative to the use of a calibration station, would be to have each system calibrate itself. Calibration could be done in real-time as the color wheel spins. As mentioned above, one of the important general parameters is the efficiency of the illumination sequence, as in the example of the PWM sequence above. One further option would be to use a self-timing cell, where the timing is determined by the value for that pixel, and the timing is matched to the color wheel rate.

The use of the white or clear segments can add brightness to the overall displayed image, but it must be used as if it were another primary color to avoid washing out the colors. In addition, the control of the white segment requires new elements to be added to a display system, including sensing means. Finally, the wheel must be calibrated to avoid adding any artifacts to the system. The advantages of brighter images can be had without increases in system cost or size, and can even lower costs and make the system more efficient.

The above discussion revolves around one implementation of the addition of white light to a display system, those systems which use color wheels. However, all of the above aspects of the invention relate to systems which have separate devices for each color, except for the layout of the color wheel, the sensor interfaces and the calibration of the color wheel. However, the calibration procedure could be used to ensure that the Y signal derived from the RGB signals is equal to the white light produced by the white device.

Thus, although there has been described to this point a particular embodiment for a method and structure for a color display system using white light, it is not intended that such specific references be considered as limitations upon the scope of this invention except in-so-far as set forth in the following claims.

What is claimed is:

1. A color wheel module, comprising:

a) a color wheel, said color wheel comprising multiple segments for transmitting filtered light, including a white segment;

b) a motor for operating the color wheel at a predetermined rate;

c) a motor controller for controlling the motor operation by determining the predetermined rate;

d) a sensor operable to read an index mark on the color wheel, wherein said index mark allows the controller to know what state the color wheel is in; and e) nonvolatile memory storing calibration information concerning the white light lumens produced by a combination of said multiple segments excluding said white segment and the white light lumens produced by said white segment such that by reading said information from said nonvolatile memory, said display system can adjust operation of said display system to improve the relationship between white light produced by the combination of non-white segments and the white light produced by the white segment.

2. The module of claim 1, wherein said sensor is magnetic.

3. The module of claim 1, wherein said sensor is optical.

4. The module of claim 1, wherein said sensor is electromechanical.

5. The module of claim 1 wherein said nonvolatile memory is an EEPROM.

6. The module of claim 1 wherein said nonvolatile memory is an EPROM.

7. The module of claim 1 wherein said nonvolatile memory is a PAL.

* * * * *